Dec. 16, 1969  G. F. BORGER  3,483,651
FISHING LURES
Filed Aug. 29, 1966
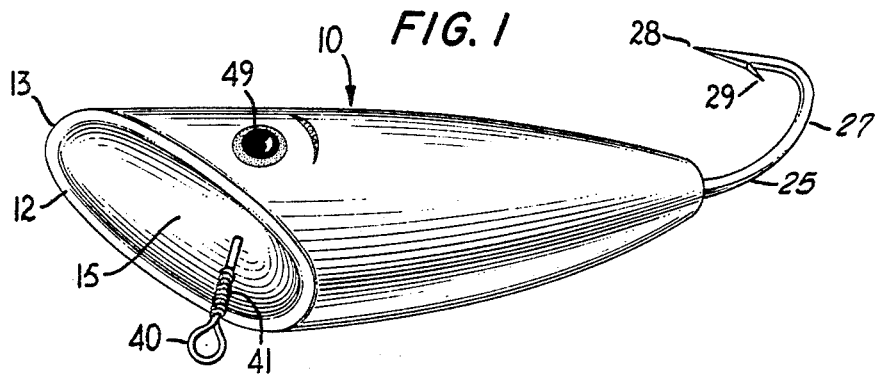
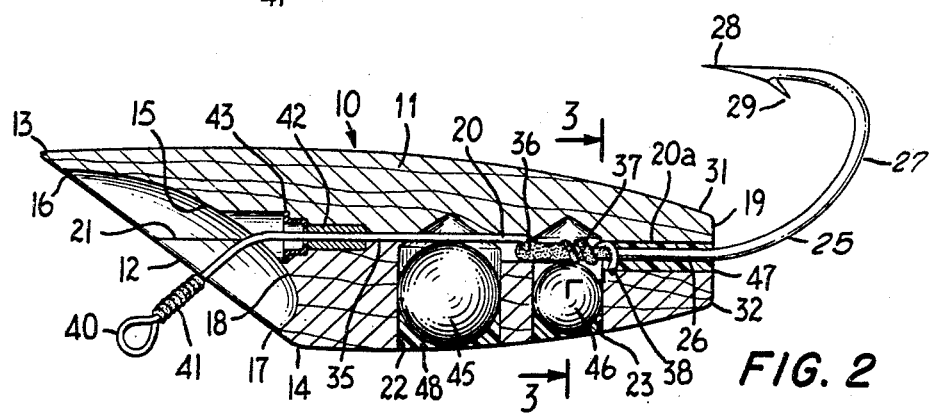
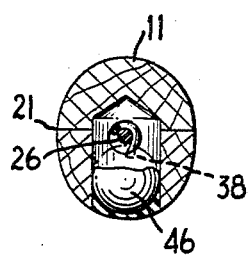
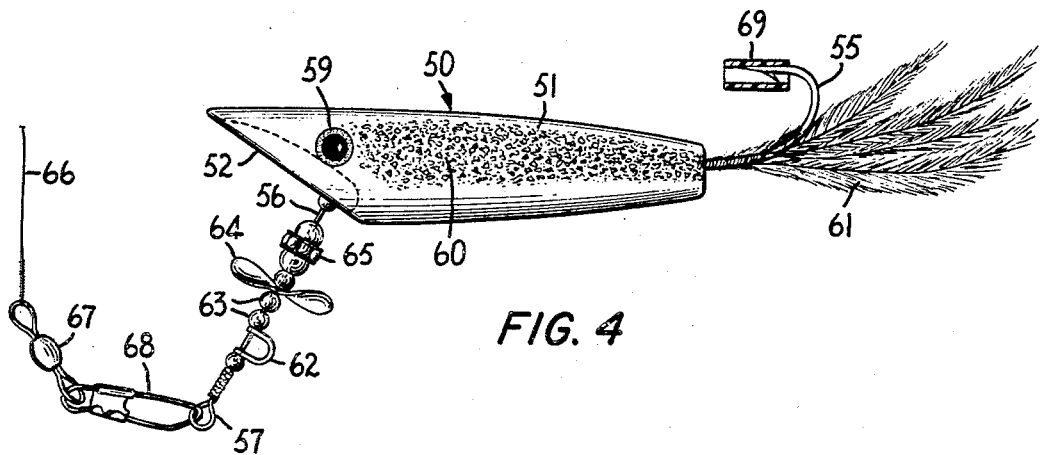

United States Patent Office 3,483,651
Patented Dec. 16, 1969

3,483,651
FISHING LURES
George F. Borger, 308 W. 49th St.,
New York, N.Y. 10019
Filed Aug. 29, 1966, Ser. No. 575,856
Int. Cl. A01k 85/00
U.S. Cl. 43—42.36          9 Claims

ABSTRACT OF THE DISCLOSURE

A fishing lure has an upwardly directed hook having a shank passing centrally through a buoyant body, with a forward jection portion of the shank turned downwardly. The body has a downwardly sloping front face with a cavitiy which is deeper near the bottom. Weights received in recesses in the lower part of the body below the hook keep the lure in upright position. Life-like movement is imparted to the lure by pulling on a line attached to the front end of the hook shank.

---

The present invention relates to lures used to attract and catch various kinds of fish.

Many fishing lures have heretofore been proposed. Some of them have required a great deal of skill to manipulate in use and could be used effectively only by a skilled angler. Others have the objectionable characteristic of catching on weeds, rocks, logs and other obstructions in the water. Frequently they cannot be freed, and are not only lost but cause breaking of the fish line on which they are used. Still other lures are ineffective in attracting fish regardless of how used. Many are of such complex and costly construction that they are priced too high for use by any but wealthy or spendthrift fishermen.

It is an object of the present invention to provide an improved fishing lure which is highly effective in attracting fish and is capable of effective use even by amateur and unskilled angles. No special skill or technique is required to control the lure so as to perform movements similar to those of live bait. It responds instantly to simple manipulation of the rod or line.

A further feature of the lure in accordance with the present invention is that it resists catching or snagging on underwater obstructions. It is oriented in the water so that the hook is up and hence not likely to catch on weeds, or on roots, stones, logs, etc. on the bottom.

Lures in accordance with the present invention have been found to be highly effective. They catch fish. Not only are the fish attracted by the lure, but its construction forces the fish to ingest the hook before inhaling the lure. Hence, the number of "nibbles" that get away is reduced.

An added advantage of lures in accordance with the invention is that they are of simple and rugged construction so that they can be manufactured economically. Moreover, they are sufficiently durable for repeated use. Lures in accordance with the invention are made either as "floaters" or "sinkers" depending on the kind of fishing for which they are intended.

Lures in accordance with the invention have the characteristic that with only simple movements of the rod or line, they can be made to simulate movements of a feeding bait fish, or of an injured bait fish attempting to avoid capture. The lure can be made to simulate a bait fish going through the various contortions of agony and exhaustion, displaying the last vestige of power to escape capture by slipping, darting, twisting, wobbling, jumping, gyrating, and turning in various directions.

The objects and advantages of the invention will appear more fully from the following description of preferred embodiments shown by way of example in the drawings in which:

FIG. 1 is a perspective view of a lure in accordance with the invention.

FIG. 2 is a longitudinal section of the lure shown in FIG. 1.

FIG. 3 is a cross section taken approximately on the line 3—3 in FIG. 2, and

FIG. 4 is a side view of another embodiment of the invention.

In FIGURES 1 to 3 there is shown by way of example a lure 10 comprising an elongated body 11 having the general shape of a fish. The term fish is used in a generic sense to include minnows, fish and other aqueous animals of all kinds and sizes suitable for bait. In the example illustrated, the body is of oval cross section with the major axis disposed vertically in the normal position of the lure. The front end 12 of the lure is inclined downwardly and rearwardly from a leading edge 13 to a point 14 where the front end face joins the lower surface of the lure. The angle of inclination of the front face 12 is preferably 40° to 55° to the longitudinal axis of the lure. In the front face 12 there is formed a concave recess 15 which in longitudinal section as seen in FIG. 2 is of somewhat parabolic shape with a curvature which increases gradually and progressively from the upper edge 16 of the recess to the lower edge 17. This results in a concavity or pocket, the deepest part of which is at a point 18, which is spaced upwardly from the bottom of the lure but below the center line. In transverse cross section, taken approximately perpendicular to the front face 12, the recess 15 is of approximately arcuate or eliptical shape. As seen in FIG. 1, the recess 15 occupies most of the front face 12, leaving only a peripheral rim disposed substantially in an inclined plane. The body decreases in cross sectional area from a maximum at, or slightly to the rear of, the point 14 to the rear end or tail 19. The rear end of the lure is of approximately circular shape although preferably somewhat oval with the major axis vertically disposed.

The body 11 is made of wood while other suitable buoyant material having a density less than that of water. Malaysian mahogany of the kind known as "Limba" or "Corina" has been found to be highly satisfactory, but other materials having suitable durability and specific gravity may be used. In order to facilitate the formation of an accurately positioned bore extending through the body of the lure, it is desirable to make the body in two parts which are joined along a medial line 21. The bore is formed by providing suitable complemental grooves in contiguous faces of the two body portions before they are joined. The body of the lure is also provided with one or more recesses 22, 23 extending upwardly from the bottom approximately to, or slightly beyond, the medial plane 21. In FIG. 2, two such recesses are shown. The forward recess 22 is approximately mid-way between the forward and aft ends of the lure while the recess 23 is smaller and located abaft the recess 22.

A fish hook 25 has a shank portion 26 received in an enlarged rearward portion 20a of the boro 20, and a hook portion 27 which curves upwardly to the rear of the body 11. The hook 25 has a point portion 28 which is located above and slightly to the front of the rear end 19 of the lure body and is preferably inclined slightly upwardly. A barb 29 is provided on the lower side of the point portion. The rearward portion 20a of the bore in which the shank 26 of the fish hook is received is eccentric of the body so that the upper rear portion 31 of the body above the shank of the hook is closer to the shank than the lower rear portion 32 so as to avoid interference with the catching of a fish on the hook.

The fish hook 25 is provided with a shank extension 35 shown in the form of stainless steel or other strong wire which passes through the usual eye 36 provided on the shank 26 and is then wrapped around the shank as indicated at 37. A tail end 38 of the wire 35 projects transversely into engagement with an adjacent portion of the body so as to assist in holding the fish hook 25 against rotation relative to the body and thereby assure that it stays in the position shown. The portion of the wire 35 which is wrapped around the shank portion of the fish hook is preferably bonded to the latter by solder, brazing or strong adhesive in order to increase the strength and rigidity of the connection.

The extension wire 35 extends forwardly through the bore 20 and into the recess 15 at the front end of the body portion of the lure, where it is bent downwardly at approximately right angles to the front face 12. At the forward end of the extension wire 35 there is formed an eye 40 for attachment to a fish line. The eye is conveniently formed by bending back an end portion of the wire and wrapping it tightly around the portion back of the eye as indicated at 41. It may, if desired, be further secured by soldering, brazing, welding or adhesive, or by wrapping with wire or other material. The length of the downwardly inclined forward portion of the wire 35 is selected in accordance with the particular characteristics desired for the lure and in particular the attitude at which it is desired to have the lure travel through the water. In the example illustrated in FIG. 2, the eye 40 is at approximately the same level as the bottom of the body portion of the lure.

The shank extension wire 35 preferably extends through a brass or other bushing 42 and a cup shaped grommet or washer 43 set into enlarged forward portions of the bore 20 in order to position the wire accurately and to prevent it from cutting into adjacent portions of the body when the wire is subjected to a strong pull, as for example, when a large or active fish has been caught on the hook. The bushing 42 and the washer 43 are desirably secured in place by a suitable adhesive.

One or more weights 45, 46 are inserted in the recesses 22, 23 provided in the lower portion of the body 11. These weights provide ballast to assure that the center of gravity of the lure is below the center of buoyancy so that when the lure is stationary in the water it is always in an upright position with the hook extending upwardly above the lure. The amount of weight used depends on the size and material of the body and whether it is desired to provide a lure that floats or one that sinks. For a "floater," the total weight of the lure is less than the amount of water displaced so that the lure is largely submerged but floats at the water surface. If a "sinker" is desired, more weight is used so that the total weight of the lure is greater than the weight of the displaced water. The weight is usually selected so that the lure will sink slowly, if it is not being pulled forwardly. The position of the weight is also selected to control the attitude of the lure so that it will stay level, or will be inclined upwardly or downwardly as desired. In the lure shown by way of example in FIG. 2, the larger weight 45 is located approximately below the center of buoyancy of the lure body while the smaller weight 46 is located rearwardly of the center of buoyancy and hence causes the lure normally to be inclined forwardly and upwardly.

The rear end portion 20a of the bore 20 and the portions of recesses 22 and 23 not occupied by the weight 45 and 46 are filled with suitable material 48 such as waterproof putty to provide a continuous and smooth exterior surface. The lure is then suitably varnished or painted or otherwise provided with a suitable protective and decorative covering. For example, the lure may be painted in colors to represent a particular kind of bait fish and may be provided with plastic or other eyes 49.

In use, the lure is attached to a suitable fish line and is cast, thrown, or dropped into the water. It is allowed to rest momentarily and will either stay at the surface—although mostly submerged—if it is a "floater" or will gradually sink down in the water if it is a "sinker." In either event it will assume an upright position with the hook disposed upwardly. At about one minute intervals the line or fishing rod tip is given a short upward movement. This is continued until the lure is completely retrieved. This simple movement of the rod or line results in imparting life-like movements to the lure so as to simulate a bait fish as described above. The lure has been found highly effective not only in attracting fish but also in securely hooking them so that they do not get away.

The lure may be made in different colors, sizes and proportions according to the variety of fish which it is desired to catch. Another of the wide variety of possible lures is illustrated by way of example in FIG. 4.

In FIG. 4 there is shown a lure 50 which in general is of the same construction as that shown in FIGS. 1 to 3. It has a body portion 51 made of buoyant material with one or more ballast weights to cause the lure either to float or sink as desired, but in either event to assume an upright position. The forward face 52 of the lure is inclined and is recessed as is shown in FIG. 2. The body 51 is provided with a longitudinal bore receiving the shank of a fish hook 55. An extension 56 of the fish hook shank is inclined forwardly and downwardly at the forward end of the lure and is provided at its end with an eye 57. It will be seen that the downwardly inclined extension of the fish hook shank is somewhat longer than in the embodiment of FIG. 2 so that the eye 57 is disposed ahead of, and considerably below, the bottom of the lure.

The lure is shown provided with plastic eyes 59 and is suitably painted or lacquered. On the sides of the lure there is provided "glitter" or "sparkle" 60 composed for example of ground metals or ground glass in natural or various colors. After application of the "glitter" or "sparkle," a light coat of clear lacquer is applied to prevent damage to the fishing line by unprotected sharp edges.

Other coloration may be used as desired. By way of example, colored feathers 61 are shown attached to the rearwardly projecting shank portion of the fish hook 55. On the downwardly inclined forward portion 56 of the hook shank extension there are shown a clevice 62 for attaching an additional hook, a plurality of beads 63, a rotatable propeller 64 and a "rondelle" 65 comprising a ring on which are mounted rhinestones, or other sparkling stones or beads. Other decorative components may be used as desired.

A fish line 66 is shown attached to the eye 57 of the shank extension 56 of the fish hook by a swivel 67 and a spring clasp 68.

The lure as shown in FIG. 4 is used as described above with reference to FIGS. 1 to 3. However, since the downwardly inclined portion of the hook shank extension is somewhat longer, a pull on the fish line tends to tip the front end of the lure up so that the lure darts upwardly.

In FIG. 4 there is also shown a hook protector 69 comprising a short piece of resilient plastic tubing having a length somewhat greater than the distance between the point and the barb of the hook and an inside diameter slightly less than the transverse dimension of the hook at the barb. The guard is easily applied and removed by squeezing it lightly so as to flatten it to elliptical cross section with a major axis greater than the transverse dimension of the hook at the barb. When the guard is applied and released, it tries to go back to its normal circular form and is securely retained on the hook. Tubing of polyethylene, nylon, or other tough resilient plastics are suitable for such use.

What I claim is:

1. A fishing lure comprising a body of buoyant material having a generally fish shape with a forward end and a rear end and a central bore extending lengthwise therethrough, said forward end having a front face inclined downwardly and rearwardly from a leading edge portion at an angle of not more than 55° to the longitudinal axis of the lure and having a concavity therein, said concavity occupying most of said front face and having a curvature that progressively increases from said leading edge portion downwardly to the lower edge portion of said front face, said concavity being approximately arcuate in transverse cross section taken approximately perpendicular to said front face, said bore opening approximately centrally into said concavity, a recess extending upwardly from the bottom of said body approximately to said central bore approximately mid-way between the fore and aft ends of the lure, selected ballast weight inserted in said recess to assure that the center of gravity of the lure is below the center of buoyancy so that when the lure is stationary in the water it assumes an upright position, a fish hook having a shank portion extending through said central bore and a hook section curving rearward and upwardly from the rear end of said body with a forwardly directed point above said body, said shank having a forward portion extending into said concavity and directed forwardly and downwardly at approximately right angles to said front face with an eye at its forward end for attachment to a line, said eye being approximately at or below the level of the bottom of said body.

2. A line according to claim 1, in which said front face is inclined at an angle of about 40° to 55° to the longitudinal axis of said body portion.

3. A lure according to claim 1, in which said eye is materially below the bottom of said lure and ahead of said front face.

4. A lure according to claim 1, in which a rear end portion of said body extends farther below said bore than above said bore.

5. A lure according to claim 1, in which said fish hook has a point portion inclined forwardly and upwardly relative to the longitudinal axis of the lure.

6. A lure according to claim 1, in which said fish hook has a point and a barb, further comprising a length of resilient cylindrical plastic tubing embracing said point and barb, said tubing having a length greater than the distance between said point and barb and an inner diameter slightly less than the transverse dimension of said hook at the barb.

7. A lure according to claim 1, in which a second recess in said body is spaced from said first mentioned recess in a direction longitudinal of said body and extends upwardly from the bottom of said body, and a second selected ballast weight is inserted in said second recess, the value and location of said ballast weights being selected to control the attitude of the lure.

8. A fishing lure comprising a body of buoyant material having a generally fish shape with a forward end and a rear end and a central bore extending lengthwise therethrough, a bushing disposed in the forward portion of said body in said bore, said forward end having a front face inclined downwardly and rearwardly from a leading edge portion and having a concavity therein, said concavity occupying most of said front face and having a curvature that increases from said leading edge portion downwardly toward the rear, said bore opening into said concavity, ballast in the lower part of said body below its center of buoyancy to cause said lure to assume an upright position, a fish hook having a shank extending through said central bore and said bushing and a hook portion curving rearwardly and upwardly from the rear end of said body with a forwardly directed point above said body, said hook shank having means thereon to prevent rotation of said shank relative to said body, said shank having a forward portion extending into said concavity and directed forwardly and downwardly with an eye at its forward end for attachment to a line.

9. A fishing lure comprising a body of buoyant material having a general fish shape with a forward end and a rear end and a central bore extending lengthwise therethrough, said forward end having a front face inclined downwardly and rearwardly from a leading edge portion and having a concavity therein, said concavity occupying most of said front face and having a curvature that increases from said leading edge portion downwardly toward the rear, said bore opening into said concavity, ballast in the lower part of said body below its center of buoyancy to cause said lure to assume an upright position, a fish hook having a shank portion extending into said central bore from the rear end of said body and a hook portion curving rearwardly and upwardly from the rear end of said body with a forwardly directed point above said body, said fish hook having a shank extension extending from said shank portion forwardly through said bore and having a forward portion extending into said concavity and directed forwardly and downwardly with an eye at its forward end for attachment to a line, and means for joining said shank portion with said shank extension and for preventing rotation of said shank portion and shank extension relative to said body.

References Cited

UNITED STATES PATENTS

| 2,878,612 | 3/1959 | Netherton et al. | 43—42.31 |
| 779,083 | 1/1905 | Jamison | 43—42.39 X |
| 1,773,561 | 8/1930 | Wethall | 43—42.4 X |
| 2,215,971 | 9/1940 | Miles | 43—42.37 X |
| 2,700,244 | 1/1955 | Greenwood | 43—57.5 |
| 2,775,060 | 12/1956 | Barker | 43—57.5 |

SAMUEL KOREN, Primary Examiner

DANIEL J. LEACH, Assistant Examiner

U.S. Cl. X.R.

43—42.37, 42.39, 42.48, 57.5